US012724595B2

(12) United States Patent
Berra et al.

(10) Patent No.: US 12,724,595 B2
(45) Date of Patent: Sep. 1, 2026

(54) GEOGRAPHIC DEPLOYMENT OF APPLICATIONS TO EDGE COMPUTING NODES

(71) Applicant: Hewlett-Packard Development Company, L.P., Spring, TX (US)

(72) Inventors: Cassio Fernando Berra, Porto Alegre (BR); Galo Gimenez Palop, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 156 days.

(21) Appl. No.: 18/001,622

(22) PCT Filed: Jun. 25, 2020

(86) PCT No.: PCT/US2020/039523
§ 371 (c)(1),
(2) Date: Dec. 13, 2022

(87) PCT Pub. No.: WO2021/262168
PCT Pub. Date: Dec. 30, 2021

(65) Prior Publication Data

US 2023/0221936 A1 Jul. 13, 2023

(51) Int. Cl.
*G06F 9/445* (2018.01)
*G06F 8/61* (2018.01)
*H04L 67/52* (2022.01)

(52) U.S. Cl.
CPC ................ *G06F 8/61* (2013.01); *H04L 67/52* (2022.05)

(58) Field of Classification Search
None
See application file for complete search history.

(56) References Cited

U.S. PATENT DOCUMENTS 10,262,019 B1 4/2019 Reiner et al.
10,607,484 B2 3/2020 Yang et al.
10,791,168 B1 * 9/2020 Dilley .................. H04L 67/288
11,032,164 B1 * 6/2021 Rothschild .............. H04L 41/40
11,204,756 B1 * 12/2021 Samuel ...................... G06F 8/65
2002/0178254 A1 * 11/2002 Brittenham ......... H04L 67/1001 709/224
2011/0077973 A1 3/2011 Breitenstein et al.
2012/0072578 A1 3/2012 Alam
(Continued)

FOREIGN PATENT DOCUMENTS

CN 110098947 A 8/2019
CN 110266744 A 9/2019
KR 10-2019-0083091 A 7/2019

*Primary Examiner* — Lanny N Ung
(74) *Attorney, Agent, or Firm* — Quarles & Brady LLP

(57) ABSTRACT

An example system for geographic deployment of applications to edge computing nodes includes: a memory storing an application; a receive engine to receive, from edge computing nodes, indications of requests for the application as received at the edge computing nodes from edge clients, the indications being indicative of geographic demand for the application; a demand engine to determine a geographic area where demand for the application exceeds a threshold demand; and an application deployment engine to deploy the application to the edge computing nodes within the geographic area where the demand for the application exceeds the threshold demand.

20 Claims, 7 Drawing Sheets

Receiving, At A Hub Computing Device, Using A Communication Unit, From Edge Computing Nodes, Indications Of Requests For An Application As Received At The Edge Computing Nodes From Edge Clients
301

Determining, At The Hub Computing Device, A Subset Of The Edge Computing Nodes Where Demand For The Application Exceeds A Threshold Demand
303

Deploying, At The Hub Computing Device, Via The Communication Unit, The Application To The Subset Of The Edge Computing Nodes Where Demand For The Application Exceeds The Threshold Demand
305

300

(56) References Cited

U.S. PATENT DOCUMENTS

| | | | | |
|---|---|---|---|---|
| 2013/0067449 | A1* | 3/2013 | Sannidhanam | G06F 8/60 717/170 |
| 2014/0108663 | A1* | 4/2014 | Peters | H04L 47/70 709/226 |
| 2016/0197835 | A1 | 7/2016 | Luft | |
| 2018/0114236 | A1* | 4/2018 | Pelikan | G06Q 30/0202 |
| 2018/0189341 | A1 | 7/2018 | Lambert et al. | |
| 2019/0356742 | A1* | 11/2019 | Ali | H04L 67/143 |
| 2019/0369984 | A1 | 12/2019 | Malladi et al. | |
| 2020/0004569 | A1* | 1/2020 | Gupta | G06F 9/5072 |
| 2020/0196210 | A1* | 6/2020 | Kanitkar | H04W 36/12 |
| 2021/0051060 | A1* | 2/2021 | Parvataneni | H04L 41/5041 |
| 2021/0075892 | A1* | 3/2021 | Chun | H04L 69/163 |

* cited by examiner

Determining, At The Hub Computing Device, A Subset Of The Edge Computing Nodes Where Demand For The Application Exceeds A Threshold Demand
303

Deploying, At The Hub Computing Device, Via The Communication Unit, The Application To The Subset Of The Edge Computing Nodes Where Demand For The Application Exceeds The Threshold Demand
305

300

GEOGRAPHIC DEPLOYMENT OF APPLICATIONS TO EDGE COMPUTING NODES

BACKGROUND

Application processing in edge computing environments may occur at edge computing nodes which often have fewer processing resources as compared to a hub device.

BRIEF DESCRIPTION OF THE DRAWINGS

Reference will now be made, by way of example only, to the accompanying drawings in which.

DETAILED DESCRIPTION

Figure 1:
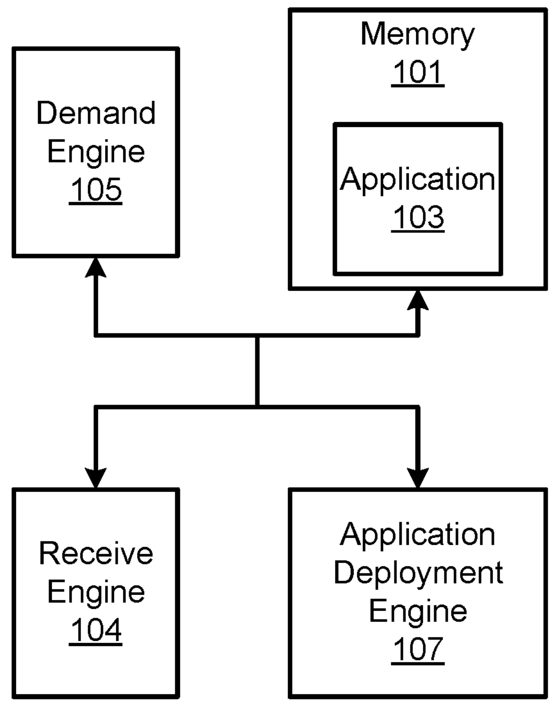
FIG. 1 is a block diagram of an example system to geographically deploy applications to edge computing nodes.
Figure 1:

Application processing in edge computing environments may occur at edge computing nodes which often have fewer processing resources as compared to a hub device. In particular, edge computing may refer to moving storage and computing power, that might otherwise be implemented in the cloud, onto edge computing nodes that are "closer" to edge clients (e.g. end-point devices) that they serve. However, edge computing nodes generally have smaller computing capacity and/or memory when compared to computing nodes in the cloud, which are referred to herein as hub computing devices.

Hence, provided herein, are systems and methods to geographically deploy applications to edge computing nodes based, for example, on demand for the application at the edge computing nodes. For example, the edge computing nodes may transmit indications of requests for an application, as received at the edge computing nodes from edge clients, to a hub computing device, which may store a copy of the application at a memory. An edge computing node may transmit the indications of requests for the application to the hub computing device regardless of whether the edge computing node has the application installed or not; the edge computing nodes may maintain a list of applications that are available for download and/or for which the hub computing device may implement the application. The hub computing device receives the indications of requests for the application and determines geographic demand for the application, for example by generating a heat map for the application. The hub computing device may determine, based on the geographic demand for the application and/or the heat map, geographic areas where demand for the application exceeds a threshold demand and responsively deploy the application to edge computing nodes within the geographic area. Furthermore, the hub computing device may cause other applications, that are in low demand at the edge computing nodes to be deleted and/or removed from the edge computing nodes, to free processing and/or memory resources for the application at the edge computing nodes. As such, the edge computing nodes that receive the application and may more efficiently service the requests for the application as compared to the application being serviced and/or processed at the hub computing device, and the like. However, edge computing nodes that do not have the application deployed thereto may rely on the hub computing device to service the requests.

An aspect of the present specification provides a system comprising: a memory storing an application; a receive engine to receive, from edge computing nodes, indications of requests for the application as received at the edge computing nodes from edge clients, the indications being indicative of geographic demand for the application; a demand engine to determine a geographic area where demand for the application exceeds a threshold demand; and an application deployment engine to deploy the application to the edge computing nodes within the geographic area where the demand for the application exceeds the threshold demand.

Another aspect of the present specification provides a method comprising: receiving, at a hub computing device, using a communication unit, from edge computing nodes, indications of requests for an application as received at the edge computing nodes from edge clients; determining, at the hub computing device, a subset of the edge computing nodes where demand for the application exceeds a threshold demand; and deploying, at the hub computing device, via the communication unit, the application to the subset of the edge computing nodes where demand for the application exceeds the threshold demand.

Another aspect of the present specification provides a non-transitory computer-readable medium comprising instructions that, when executed by a processor, cause the processor to: execute a receive module to receive, from edge computing nodes, indications of requests for an application as received at the edge computing nodes from edge clients, the indications being indicative of geographic demand for the application; execute a heat map module to generate a heat map representing the geographic demand for the application; and execute an application deployment module to deploy the application to the edge computing nodes based on the heat map.

FIG. 1 is a block diagram of an example system 100 to geographically deploy applications to edge computing nodes. As will be explained hereafter, the system 100 comprises various engines used to geographically deploy applications to edge computing nodes. Communication between components and/or engines described herein is shown in the figures of the present specification as arrows therebetween. Term "geographically deploy" (and the like) as used herein may be understood to mean transmitting and/or deploying an application (and/or a copy of instructions of the application) to edge computing nodes based on respective geographic locations of the edge computing nodes such that the edge computing nodes that receive the application may install and/or process the application such that the edge computing nodes may, in response to receiving requests for the application and/or services provided by the application, process and/or service the requests via processing the application. Hence geographically deploy does not merely indicate caching of the application at the edge computing nodes.

Similarly, the terms "deploy" and/or "deploying", and the like, an application to an edge computing node, as used herein, may be further understood to include transmitting an application (and/or a copy of instructions of the application) to edge computing nodes (e.g. based on demand at the edge computing nodes and/or a demand in a geographic area) such that the edge computing nodes that receive the application may install and/or process the application such that the edge computing nodes may, in response to receiving requests for the application and/or services provided by the application, process and/or service the requests via processing the application.

Similarly, the term "receiving requests for the application", and the like, may be understood to include receiving requests for services provided by the application.

As depicted the system 100 comprises a memory 101 storing an application 103. The memory 101 may include memory including, but not limited to, a volatile memory (e.g., volatile RAM, a processor cache, a processor register, etc.), a non-volatile memory (e.g., a magnetic storage device, an optical storage device, flash memory, read-only memory, non-volatile RAM, etc.), and/or the like.

The application 103 may comprise a copy of instructions for implementing any suitable application at an edge computing node, such as a website, a navigation application, an internet-of-things (IoT) application, a machine learning application type (e.g. to process data generated by autonomous vehicles), and the like.

As depicted, the system 100 further comprises a receive engine 104 to receive, from edge computing nodes (not depicted, but described in further detail below), indications of requests for the application 103 as received at the edge computing nodes from edge clients (not depicted, but described in further detail below), the indications being indicative of geographic demand for the application 103.

Furthermore, as used herein, the term "engine" refers to hardware (e.g., a processor, such as a central processing unit (CPU) an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

Hence, the receive engine 104 may comprise hardware or a combination of hardware and software for receiving, from edge computing nodes, indications of requests for the application 103, for example via a communication unit, and the like, which may be a component of the receive engine 104 and/or a separate component of the system 100. In some examples, the receive engine 104 may comprise a portion of a server and/or a computing device and/or a hub computing device, which hosts the system 100. Similarly, the memory 101, as well other engines of the system 100, may comprise respective portions of a server and/or a computing device and/or a hub computing device, which hosts the system 100.

As depicted, the system 100 further comprises a demand engine 105 to determine a geographic area where demand for the application 103 exceeds a threshold demand.

For example, while not depicted, the system 100 may further comprise a heat map engine to generate a heat map representing the geographic demand for the application 103, which may be generated based on the indications received via the receive engine 104. For example, the indications may be received with metadata indicating respective geographic locations of edge computing nodes at which the requests are received, and the heat map engine may determine numbers of requests received at the geographic locations of the edge computing nodes as indicated by the indications, and generate a heat map therefrom. For example, the edge computing nodes may be preconfigured with their respective geographic locations and/or geotagged (e.g. a respective geographic location and/or respective geotag may be stored at a memory of an edge computing device), and the edge computing nodes may be to transmit the geographic locations (e.g. including, but not limited to, a geotag), to the receive engine 104, as metadata in the indications of requests for the application 103. In some examples, the geographic locations (e.g. including, but not limited to, the geotags) may include, but are not limited to, Global Position System (GPS) locations, and the like, street addresses, and the like, GPS data indicative of bounding polygons, and the like, around edge computing nodes, and the like. However the metadata indicating respective geographic locations of edge computing nodes may be in any suitable format.

However, in some examples, the geographic location of the edge computing nodes may be predetermined and stored at the memory 101, and the like, in association with identifiers of the edge computing nodes (e.g. network addresses, Media Access Control (MAC) addresses, and the like). Furthermore, the indications may be received with similar identifiers (e.g. in metadata of the indications) of the edge computing nodes, and the heat map may be generated by comparing the identifiers of the edge computing nodes received in the indications, with the identifiers stored in the memory 101, and the like, and the numbers of requests received at the edge computing nodes as indicated by the indications.

In some examples, while not depicted, the system 100 may further comprise a geographic location engine to determine geographic locations of the edge computing nodes from which the indications are received based on: geographic metadata received with the indications; or respective geographic metadata stored at the memory 101 in association with identifiers of the edge computing nodes, the indications received with the identifiers. However, such functionality may be incorporated into the demand engine 105 and/or a heat map engine and, similarly, functionality of a heat map engine and/or a geographic location engine may be incorporated into the demand engine 105.

In examples that include a heat map being generated, the demand engine 105 may be further to determine the geographic area where the demand for the application 103 exceeds the threshold demand based on the heat map. For example, the heat map may indicate a number of requests received in a geographic area per given time period, and the threshold demand may comprise a threshold number of requests per given time period; as such, the threshold demand may be used to determine geographic areas of the heat map where demand for the application 103 exceeds the threshold demand such that edge computing nodes within such geographic areas may be determined.

However, in some examples, the demand for the application 103 may be determined without a heat map, and/or in any suitable manner, using a determined demand for the application 103 in geographic areas and the threshold demand.

Furthermore, the threshold demand may be determined heuristically and/or adjusted dynamically based, for example, on available processing and/or memory resources at the edge computing nodes, numbers of edge computing nodes in geographic areas, and the like, for example as stored and/or updated at the memory 101, and the like, and maintained by the system 100 (e.g. via the edge computing nodes registering with the system 100). In some examples, the threshold demand may be determined via a machine learning algorithm and/or model trained to determine and/or dynamically adjust the threshold demand.

As depicted, the system 100 further comprises an application deployment engine 107 to deploy the application 103 to the edge computing nodes within the geographic area where the demand for the application 103 exceeds the threshold demand. For example, the application deployment engine 107 may include a communication unit, and/or share a communication unit with the receive engine 104, and the application deployment engine 107 may deploy (e.g. transit) the application 103 to the edge computing nodes within the geographic area where the demand for the application 103 exceeds the threshold demand via the communication unit.

In some examples, the application deployment engine 107 may track which edge computing nodes have the application 103 already installed, and which edge computing nodes do not have the application 103 already installed (e.g. by storing indications of such at the memory 101, and the like based on edge computing nodes registering with the system 100 and/or previous deployment of the application 103 to the edge computing nodes by the system 100). In some of these examples, the application deployment engine 107 may be further to, during deploying the application 103, refrain from deploying the application 103 to the edge computing nodes where the application 103 is already installed, for example to save bandwidth, and the like.

Furthermore, while not depicted, in some examples, the system 100 may further comprise a delete engine to: transmit commands to a subset of the edge computing nodes within the geographic area, where the demand for the application exceeds the threshold demand, the commands to delete an additional application to clear memory space for storing the application 103, wherein demand for the additional application is determined to be below the threshold demand. Put another way, the receive engine 104 may be further to receive respective indications of requests for an additional application as received at the edge computing nodes from edge clients, the respective indications being indicative of geographic demand for the additional application; and the demand engine 105 may be further to determine whether demand for the other application exceeds or does not exceed a respective threshold demand (which may be the same as, or different from, the threshold demand for the application 103). In examples where the respective demand for the additional application is below the respective threshold demand, the delete engine may transmit commands to a subset of the edge computing nodes within the geographic area, where the demand for the application 103 exceeds the threshold demand, the commands to delete the additional application to free processing and/or memory resources for the application 103 at the edge computing nodes. However, functionality of a delete engine may be incorporated in to the application deployment engine 107.

In some examples, the receive engine 104 may be further to: continue to receive from the edge computing nodes, the indications of requests for the application 103 as received at the edge computing nodes from the edge clients. Similarly, in these examples, the demand engine 105 may be further to: update the geographic area where the demand for the application 103 exceeds the threshold demand based on the indications that continue to be received. Similarly, in these examples, the application deployment engine 107 may be further to update deployment of the application 103 to the edge computing nodes within the geographic area as updated; such updating of the deployment of the application 103 may include causing the application 103 to be deleted (e.g. via a delete engine and the like) and/or removed from geographic areas and/or edge computing nodes where demand falls below the threshold demand. Hence, the system 100 may dynamically change deployment of the application 103 as demand for the application 103 changes.

In some examples, an engine and/or engines of the system 100 (e.g. the application deployment engine 107 and/or a list engine) may be to: deploy to (and/or transmit) to the edge computing nodes, a list of applications available to be deployed, the list including the application 103, to enable the edge computing nodes to recognize the requests for the application 103. For example, edge clients may transmit requests for many different applications to the edge computing nodes, some of which may be supported by the system 100 and some which may not be supported by the system 100; hence, the list generally includes data that enables the edge computing nodes to recognize a request for an application that is supported by the system 100 to further enable the edge computing nodes to generate the indications of requests for the application 103 (as well as other applications supported by the system 100) as received at the edge computing nodes from the edge clients; requests received for applications not supported by the system 100 may be ignored by the edge computing nodes. The term "application(s) supported by the system 100", and the like, may be understood to mean applications (such as the application 103) that the system 100 is generally configured to process, at edge computing nodes, a hub computing device (e.g. that may include the memory 101 and the engines 104, 105, 107), and the like; as such, the system 100 may further include an application engine and/or application engines, which processes applications stored at the memory 101 including, but not limited to, the application 103.

In yet further examples, the engines of the system 100 (e.g. the demand engine 105 and the application deployment engine 107) may be further to: determine a subset of the edge computing nodes where demand for the application 103 exceeds the threshold demand; and deploy the application 103 to the subset of the edge computing nodes where demand for the application 103 exceeds the threshold demand. In these examples, the application 103 may be deployed without specific reference to the geographic location and/or geographic area of the edge computing nodes.

Figure 2:
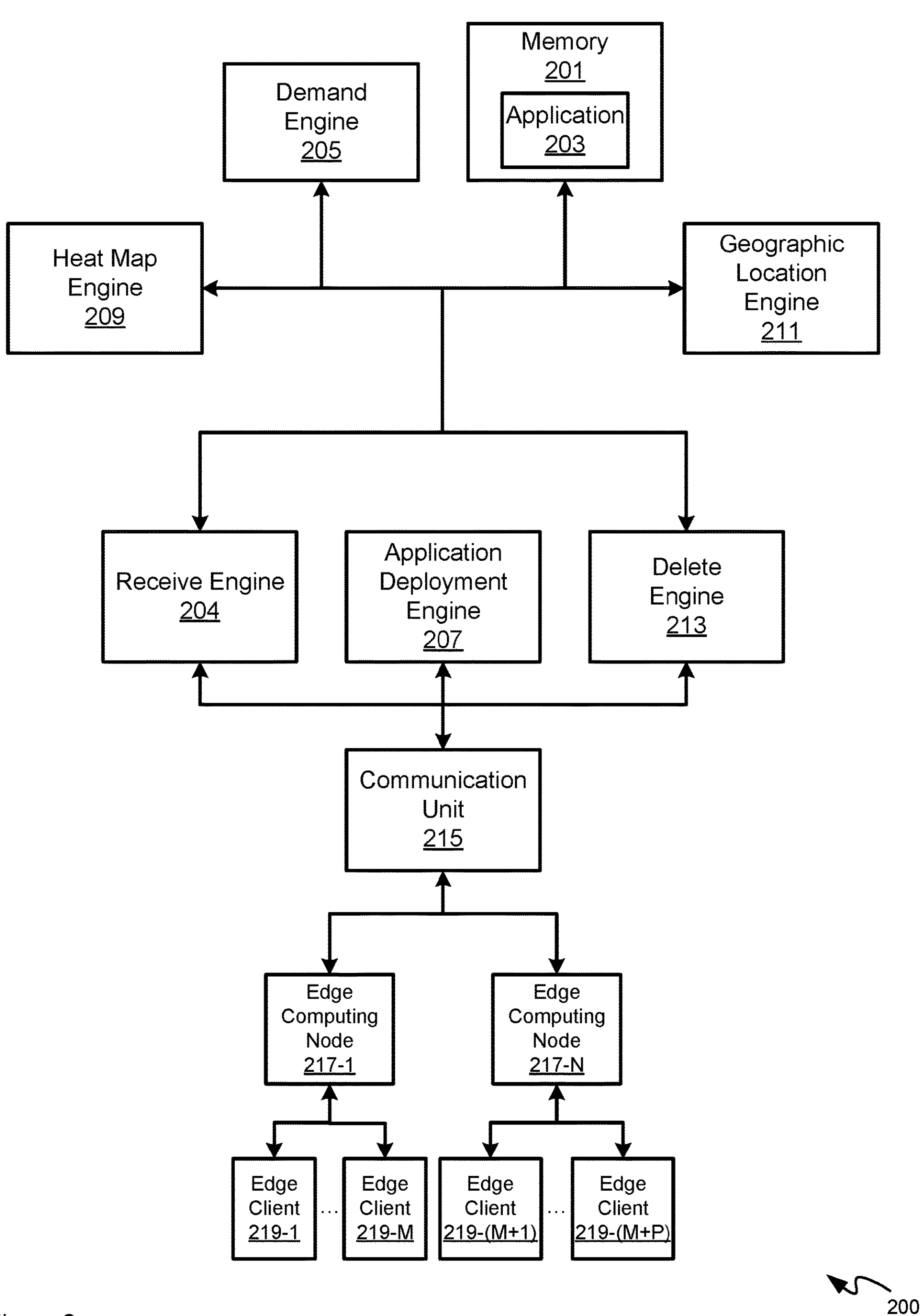
FIG. 2 a block diagram of another example system to geographically deploy applications to edge computing nodes.

Attention is next directed to FIG. 2 which is a block diagram of another example system 200 to geographically deploy applications to edge computing nodes. The system 200 is substantially similar to the system 100, with similar components having similar numbers, but in a "200" series" rather than a "100" series. However, in contrast to the system 100, the system 200 comprises a heat map engine, a geographic location engine, a delete engine, a communication unit, edge computing nodes (e.g. located in different geographic areas) and edge clients, as described hereafter.

For example, the system 200 comprises: a memory 201 storing an application 203; a receive engine 204 to receive, from edge computing nodes, indications of requests for the application 203 as received at the edge computing nodes from edge clients, the indications being indicative of geographic demand for the application 203 and/or the indications being indicative of respective demand for the application 203 at the edge computing nodes; a demand engine 205 to determine a geographic area where demand for the application 203 exceeds a threshold demand and/or to determine a subset of the edge computing nodes where demand for the application 203 exceeds a threshold demand; and an application deployment engine 207 to deploy the application 203 to the edge computing nodes within the geographic area where the demand for the application exceeds the threshold demand and/or to deploy the application 203 to the subset of the edge computing nodes where demand for the application 203 exceeds the threshold demand.

Whether the system 200 determines demand for the application 203 based on geographic area, or on respective demand at the edge computing nodes, may depend on a mode of the system 200. For example, a system administrator, and the like, may cause the system 200 to be operated in a first mode based on geographic demand for the application 203, or a second mode based on respective demand at the edge computing nodes, depending, for example, on processing resources and/or numbers of edge computing nodes within geographic areas. Such switching of modes may also occur via machine learning algorithms and/or models (e.g. at the demand engine 205 and/or any other suitable engine) trained to switch between the modes.

In contrast to the system 100, the system 200 further comprises: a heat map engine 209 to generate a heat map representing the geographic demand for the application 203; in these examples, the demand engine 205 may be further to determine the geographic area where the demand for the application 203 exceeds the threshold demand based on the heat map, as described above.

The system 200 further comprises: a geographic location engine 211 to determine geographic locations of the edge computing nodes from which the indications are received based on: geographic metadata received with the indications; or respective geographic metadata stored at the memory 201 (not depicted) in association with identifiers of the edge computing nodes, the indications received with the identifiers.

The system 200 further comprises: a delete engine 213 to: transmit commands to a subset of the edge computing nodes within a geographic area, where the demand for the application 203 exceeds the threshold demand, the commands to delete an additional application to clear memory space for storing the application 203, wherein demand for the additional application is determined to be below the threshold demand and/or a respective threshold demand. Hence, for example, in some of these examples, the delete engine 213 (and/or the demand engine 205 and/or another of the engines) may be further to, prior to the application deployment engine 207 deploying the application 203 to the edge computing nodes, determine a portion of the edge computing devices where respective available memory space is insufficient to store the application 203; and transmit commands to the portion of the edge computing devices where the respective available memory is insufficient to store the application 203, the commands to delete an additional application to increase the respective available memory space for storing the application 203.

The system 200 further comprises a communication unit 215 which may be used by the receive engine 204, the application deployment engine 217 and/or the delete engine 213 to communicate with edge computing nodes.

The memory 201, the engines 204, 205, 207, 209, 211, 213 and the communication unit 215 may be components of a hub computing device, as described above. Such a hub computing device may be further to process the application 203 on behalf of edge computing devices to which the application 203 is not deployed.

Furthermore, as described above, while the functionality of the engines 204, 205, 207, 209, 211, 213 is described in a particular manner herein, the functionality of the engines 204, 205, 207, 209, 211, 213 may be distributed amongst fewer or more engines than depicted in FIG. 2.

The system 200 further comprises an integer number "N" of edge computing nodes 217-1 . . . 217-N deployed for example, throughout a geographic region. The edge computing nodes 217-1 . . . 217-N are interchangeably referred to hereafter as, collectively, the edge computing nodes 217 and, generically, as an edge computing node 217.

The system further comprises edge clients 219-1 . . . 219-M, 219-(M+1) . . . 219-(M+P). The edge clients 219-1 . . . 219-M, 219-(M+1) . . . 219-(M+P) are interchangeably referred to hereafter as, collectively, the edge clients 219 and, generically, as an edge client 219. In particular, there are an integer number of "M" of edge clients 219 in communication with the edge computing node 217-1, and an integer number of "P" of edge clients 219 in communication with the edge computing node 217-N.

The edge computing nodes 217 may comprise any suitable edge computing node including, but not limited to, computing devices located at cell network towers (including, but not limited to 5G towers), nodes in communication with cell network towers, and the like. The edge clients 219 may comprise any suitable computing device and/or communication device that requests services associated with the application 203 and/or other applications serviced by the system 200 (and/or the system 100) including, but not limited to, personal computers, laptop computers, mobile devices and/or phones, vehicles, autonomous, vehicles drones, and the like. In some examples, an edge computing node 217 may comprise an edge client 219 and/or a portion of an edge client 219. However, any suitable combination of numbers and/or types of edge computing nodes 217 and edge clients 219 is within the scope of the present specification.

In particular, the edge computing nodes 217 are understood to be located at different respective geographic locations, for example within a geographic region, and furthermore the edge clients 219 may roam and/or move about the geographic region. An edge computing node 217 may handoff communication with the edge clients 219 to another edge computing node 217. For example, an edge client 219 may initially be communicating with one edge computing node 217 and may change to communicating with another edge computing node 217 as the edge client 219 moves. As the edge clients 219 move, they may request services associated with the application 203 from an edge computing node 217 with which they are in present communication. As such, demand for the application 203 may geographically change as the edge clients 219 move.

As such, and as has been previously described, the engines 204, 205, 207, 209, 211, 213 generally determine at which edge computing nodes 217 the demand for the application 203 exceeds a threshold demand, by geographic area and/or by respective demand at the edge computing nodes 217, and deploy (and/or delete) the application 203 accordingly.

It is understood that geographic demand for the application 203 may be determined from a heat map of the demand, for example as generated by the heat map engine 209. As such, geographic areas where the demand exceeds the threshold demand may grow or shrink depending on changes in demand for the application 203. As such, geographic areas referred to herein (e.g. which may be subsets of a larger geographic region in which the edge computing nodes 217 are deployed) may not be preconfigured, but may be determined dynamically depending on changes in the demand for the application 203.

It is further understood that, when the application 203 is deployed based on geographic demand for the application 203, the application 203 may be deployed to edge computing nodes 217 within a geographic area where the demand exceeds the threshold demand regardless of respective demand for the application 203 at the individual edge computing nodes 217 within the geographic area.

Regardless, the demand may be alternatively determined based on respective demand for the application 203 at the individual edge computing nodes 217 which may, or may not, include determining demand by geographic area. Such an example is next described.

Figure 3:
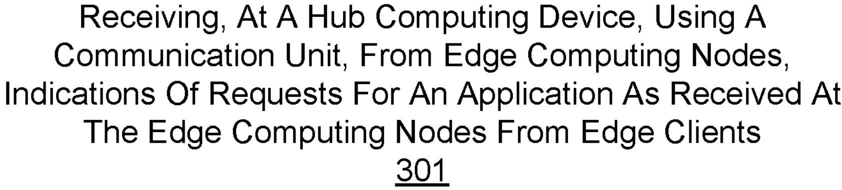
FIG. 3 is a flow diagram of an example method to deploy applications to edge computing nodes.

Referring to FIG. 3, a flowchart of an example method 300 to implement a method to deploy applications to edge computing nodes. In order to assist in the explanation of method 300, it will be assumed that method 300 may be performed with the system 200, and at least partially by a hub computing device implementing at least the engines 204, 205, 207, 209, 211, 213 of the system 200 and/or a processor and/or processors thereof. The method 300 may be one way in which the system 200 may be configured. Furthermore, the following discussion of method 300 may lead to a further understanding of the system 200, and its various components. Furthermore, it is to be emphasized, that method 300 may not be performed in the exact sequence as shown, and various blocks may be performed in parallel rather than in sequence, or in a different sequence altogether. Furthermore, it is to be emphasized that the method 300 may alternatively be performed with the system 100, and at least partially by a hub computing device implementing the system 100 and/or a processor thereof Beginning at a block 301, a hub computing device receives, using the communication unit 215, from the edge computing nodes 217, indications of requests for the application 203 as received at the edge computing nodes 217 from the edge clients 219. The block 301 may be implemented via the receive engine 204. It is further understood that the edge computing nodes 217 generally transmit indications of requests for the application 203 regardless of whether the application 203 has been previously installed, or not, at the edge computing nodes 217.

At a block 303, the hub computing device determines a subset of the edge computing nodes 217 where demand for the application 203 exceeds a threshold demand. The block 303 may be implemented via the demand engine 205. As described above, such demand may be based on geographic demand determined using a heat map, and/or such demand may be based on respective demand at the individual edge computing nodes 217.

At a block 305, the hub computing device deploys, via the communication unit 215, the application 203 to the subset of the edge computing nodes 217 where demand for the application 203 exceeds the threshold demand. The block 305 may be implemented via the application deployment engine 207.

The block 305 may include the hub computing device deploying the application 203 to the subset of the edge computing nodes 217 where the demand for the application 203 exceeds the threshold demand by: deploying, at the hub computing device, using the communication unit 215, the application 203 to a portion of the subset of the edge computing nodes 217 where the application 203 is not already deployed (e.g. and refraining from deploying the application 203 to an additional portion of the subset of the edge computing nodes 217 where the application 203 is already deployed).

As has already been described, in some examples, the method 300 may further comprise: deploying, at the hub computing device, to the edge computing nodes 217, via the communication unit 215, a list of applications available to be deployed (e.g. the list including the application 203, to enable the edge computing nodes 217 to recognize the requests for the application 203.

As has already been described, in some examples, the method 300 may further comprise: prior to deploying the application 203 to the subset of the edge computing nodes 217, determining a portion of the subset of the edge computing nodes 217 where respective available memory space is insufficient to store the application 203; and transmitting commands to the portion of the subset where the respective available memory is insufficient to store the application 203, the commands to delete an additional application to increase the respective available memory space for storing the application. For example, the hub computing device may periodically, and the like, poll the edge computing nodes 217 to determine available memory space and store the respective available memory space at the memory 201 (e.g. as received in responses from the edge computing nodes 217) and/or the hub computing device may, prior to deploying the application 203 to the subset of the edge computing nodes 217, request, from the subset of the edge computing nodes 217, an indication of respective available memory space (e.g. and the subset of the edge computing nodes 217 may provide responses to such requests indicating respective available memory space).

Furthermore, as has already been described, in some examples, the method 300 may further comprise: implementing, at the hub computing device, the application 203 for an additional subset of the edge computing nodes 217 where the application 203 is not deployed and where the demand is below the threshold demand. In these examples, the additional subset of the edge computing nodes 217 where the application 203 is not deployed may act as proxies and/or go-betweens for the hub computing device which services the requests for the application 203.

Figure 4:
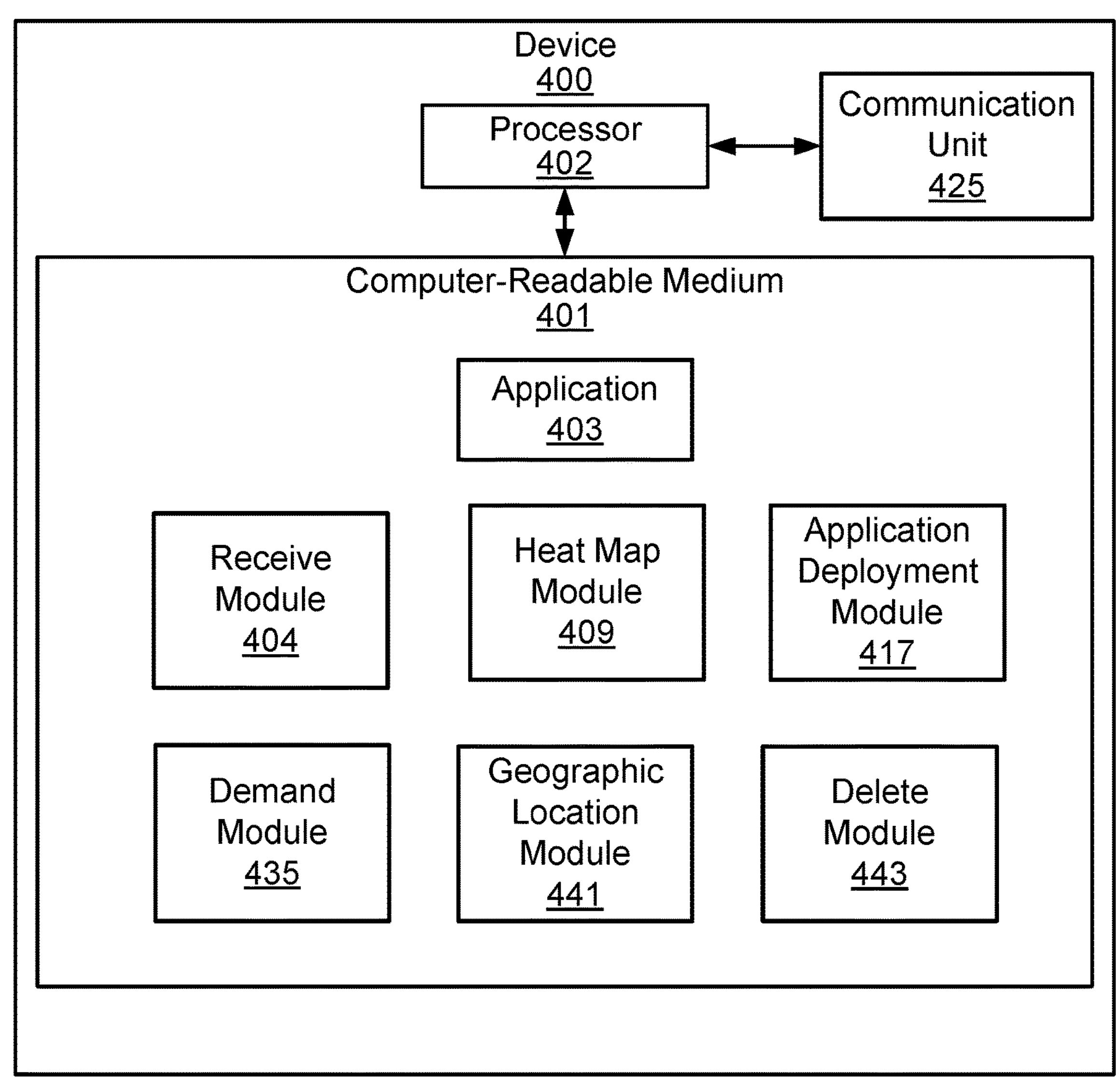
FIG. 4 is a block diagram of an example computer-readable medium including instructions that causes a processor to geographically deploy applications to edge computing nodes.

For example, FIG. 4 is a block diagram of an example device 400 that includes a computer-readable medium 401 and a processor 402. The computer-readable medium 401 includes instructions that, when implemented by the processor 402, cause the processor 402 to geographically deploy applications to edge computing nodes. For example, as depicted, the computer-readable medium 401 stores an application 403 that may be similar to, or different from, the applications 103, 203.

The computer-readable medium 401 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 402 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc. The computer-readable medium 401 or the processor 402 may be distributed among a plurality of computer-readable media or a plurality of processors.

The computer-readable medium 401 includes modules. As used herein, a "module" (in some examples referred to as a "software module") is a set of instructions that when executed or interpreted by a processor or stored at a processor-readable medium realizes a component or performs a method.

The computer-readable medium 401 may include a receive module 404 which, when processed by the processor 402, causes the processor 402: to receive, from edge computing nodes (e.g. edge computing nodes 217), indications of requests for the application 403 as received at the edge computing nodes from edge clients (e.g. edge clients 219), the indications being indicative of geographic demand for the application 403.

The computer-readable medium 401 may include a heat map module 409 which, when processed by the processor 402, causes the processor 402 to: generate a heat map representing the geographic demand for the application 403.

The computer-readable medium 401 may include an application deployment module 417 which, when processed by the processor 402, causes the processor 402 to: to deploy the application 403 to the edge computing nodes based on the heat map.

For example, the application deployment module 417 may be further to cause the processor 402 to: deploy the application 403 to the edge computing nodes based on the heat map by: deploying the application 403 to the edge computing nodes in first geographic areas where the demand exceeds a threshold demand, according to the heat map; and refraining from deploying the application 403 to the edge computing nodes in second geographic areas where the demand is below the threshold demand, according to the heat map.

For example, as depicted, the device 400 further comprises a communication unit 425, which may be similar to, or different from, the communication unit 215, and the receive module 404 and the application deployment module 417 may communicate with edge computing nodes via the communication unit 425.

In some examples, the heat map module 409 is further to cause the processor 402 to: update the heat map as further indications, indicative of updated geographic demand for the application 403, are received via the receive module 404; in these examples, the application deployment module 417 is further to cause the processor 402 to: again deploy the application 403 to the edge computing nodes based on the heat map as updated.

As depicted, the computer-readable medium 401 may optionally further comprise a demand module 435 which, when executed by the processor 402, may cause the processor 402 to implement functionality similar to the demand engines 105, 205, as described above. However, in other examples, such functionality may be incorporated into the heat map module 409.

As depicted, the computer-readable medium 401 may optionally further comprise a geographic location module 441 which, when executed by the processor 402, may cause the processor 402 to implement functionality similar to the geographic location engine 211, as described above. However, in other examples, such functionality may be incorporated into the heat map module 409.

As depicted, the computer-readable medium 401 may optionally further comprise a delete module 443 which, when executed by the processor 402, may cause the processor 402 to implement functionality similar to the delete engine 213, as described above. However, in other examples, such functionality may be incorporated into the application deployment module 417.

However, in some examples, the receive module 404 may be to further to cause the processor 402 to: receive, from the edge computing nodes, additional indications of additional requests for an additional application (not depicted, but which may be stored at the computer-readable medium 401) as received at the edge computing nodes from the edge clients, the additional indications being indicative of respective geographic demand for the additional application. In these examples, the heat map module 409 may be further to cause the processor 402 to: generate a respective heat map representing the respective geographic demand for the additional application. Similarly, in these examples, the delete module 443 may be to cause the processor 402: transmit commands (e.g. via the communication unit 425) to delete the additional application at the edge computing nodes according to the respective heat map, to clear respective memory space at the edge computing nodes for deploying the application 403. However, in other examples, the application deployment module 417 may be further to cause the processor 402 to: deploy (e.g. using the communication unit 425), the additional application to the edge computing nodes based on the respective heat map representing the respective geographic demand for the additional application, similar to the application 403 being deployed.

It is further understood that the heat map module 409 may be further to cause the processor 402 to: update the heat map as further indications, indicative of updated geographic demand for the application, are received via the receive module 404. In these examples, the application deployment module 417 may be further to cause the processor 402 to: again deploy the application 403 to the edge computing nodes based on the heat map as updated, which may include, but is not limited to, transmitting the application 403 to edge computing nodes, or causing the application 403 to be deleted at edge computing nodes where demand has fallen below the threshold demand, as determined via the updated heat map.

In some examples, the application deployment module 417 may be further to cause the processor 402 to: during deploying the application 403, refrain from deploying the application 403 to the edge computing nodes where the application 403 is already installed.

Figure 5:
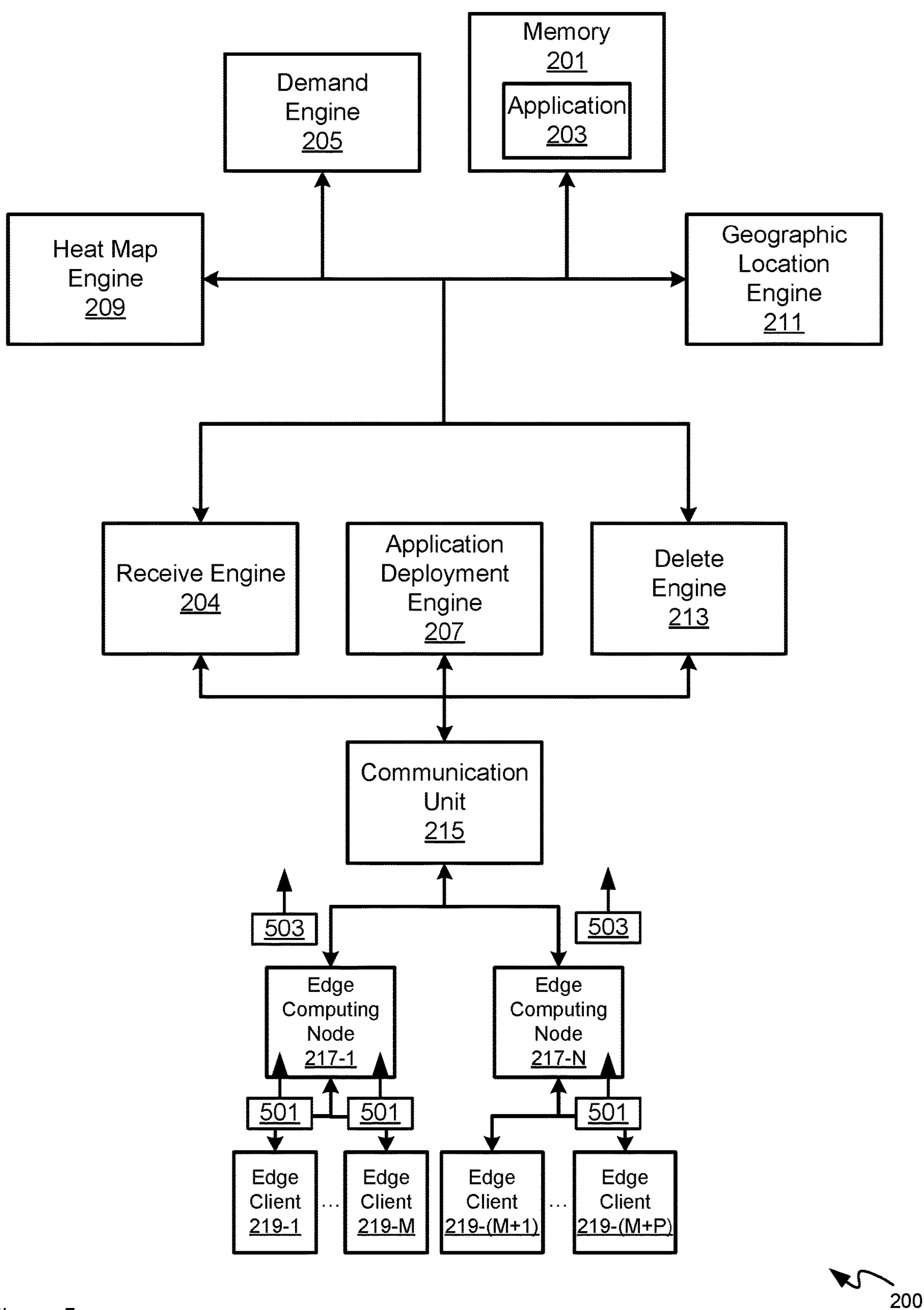
FIG. 5 depicts edge computing nodes of the system of FIG. 2 transmitting indications of requests for an application as received from edge clients.
Figure 6:
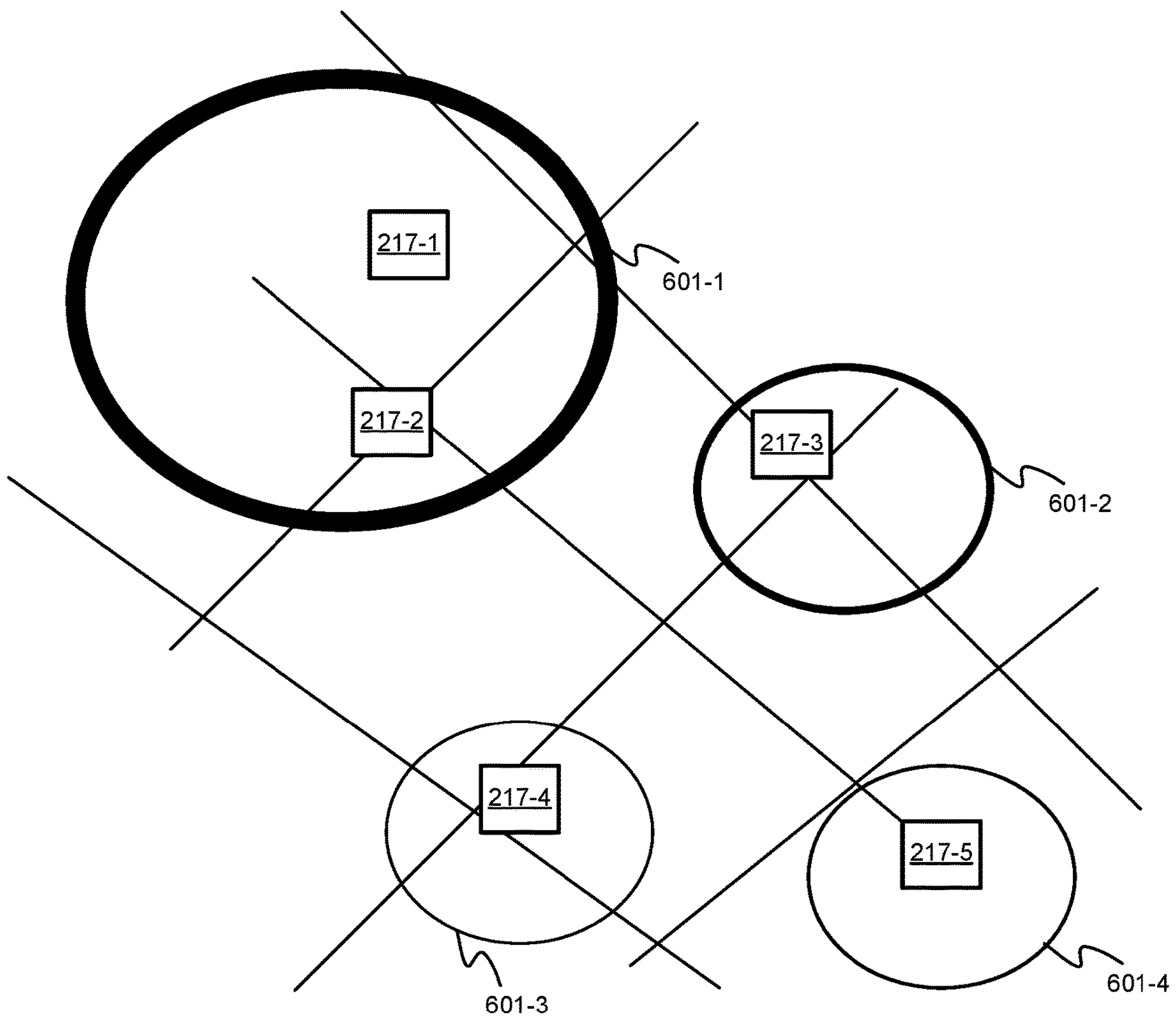
FIG. 6 depicts an example heat map of requests for an application.
Figure 7:
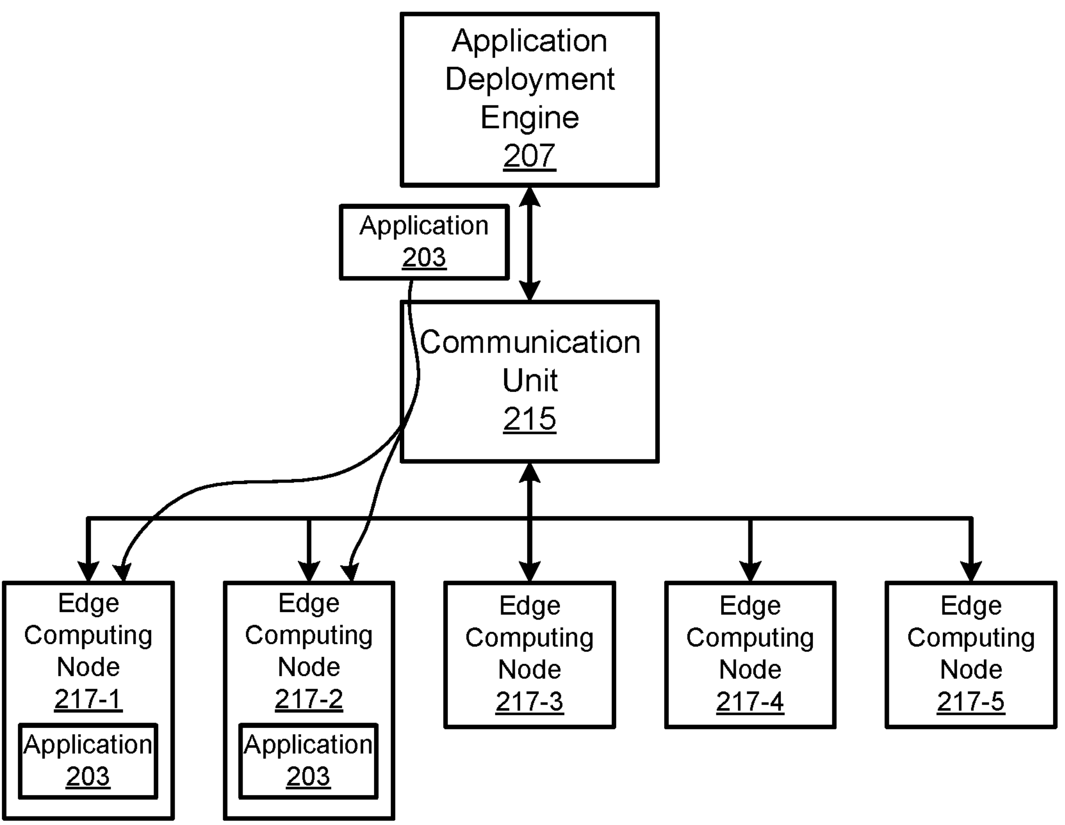
FIG. 7 depicts an application being geographically deployed in the system of FIG. 2.

Attention is next directed to FIG. 5, FIG. 6 and FIG. 7 which depicts aspects of the present specification.

Attention is next directed to FIG. 5 which is substantially similar to FIG. 2, with like components having like numbers. However in FIG. 5, the edge clients 219 are transmitting requests 501 for the application 203 to the edge computing nodes 217. As depicted, the edge computing node 217-1 is receiving more requests 501 than the edge computing node 217-N. Also depicted in FIG. 5, the edge computing nodes 217 are transmitting respective indications 503 of the requests 501 for the application 203 as received at the edge computing nodes 217 from the edge clients 219, and/or the indications 503 are indicative of geographic demand for the application 203. For example, the indications 503 may include a number and/or a count of the requests 501 received within a given time period (e.g. a minute, an hour, etc.) at a respective edge computing node 217. The indications 503 may be received at the receive engine 204 via the communication unit 215 and passed to the demand engine 205, the heat map engine 209 and/or the geographic location engine 211. In the particular example, a heat map is generated (e.g. by the heat map engine 209) based on the indications 503.

For example, attention is next directed to FIG. 6 which depicts a simplified heat map 600 which may be generated by the heat map engine 209, and the like. As depicted, the heat map 600 shows locations of five edge computing nodes 217-1, 217-2, 217-3, 217-4, 217-5 on a map of a geographic region (e.g. showing streets, etc.). As depicted, the geographic region has been divided into geographic areas 601-1, 601-2, 601-3, 601-4 (interchangeably referred to hereafter, collectively, as the geographic areas 601 and, generically, as a geographic area 601). Demand for the application 203, for example as determined from the indications 503, is indicated by a width of a respective line surrounding the geographic areas 601. As such, it is understood from the heat map 600 that demand for the application 203 is highest in the geographic area 601-1, which includes the edge computing nodes 217-1, 217-2, next highest in the geographic area 601-1, which includes the edge computing node 217-3, and the lowest demand is in the geographic areas 601-3, 601-4, which respectively include the edge computing nodes 217-4, 217-5.

The demand engine 205 may compare the demand in the geographic areas 601 to a threshold demand to determine in which of the geographic areas 601 has a demand for the application 203 that exceeds the threshold demand. In the present example, the demand engine 205 may determine that demand for the application 203 exceeds the threshold demand in the geographic area 601-1, and the demand engine 205 may determine that demand for the application 203 does exceeds the threshold demand in the geographic areas 601-2, 601-3, 601-4.

Hence, attention is next directed to FIG. 7 which depicts a portion of the system 200 with the five edge computing nodes 217-1, 217-2, 217-3, 217-4, 217-5 shown in communication with the application deployment engine 207 via the communication unit 215. While other components of the system 200 are not depicted, they are nonetheless understood to be present. As the demand engine 205 may determine that demand for the application 203 exceeds the threshold demand in the geographic area 601-1 (e.g. but not the geographic areas 601-2, 601-3, 601-4) and as the edge computing nodes 217-1, 217-2 are located in the geographic area 601-1, the application deployment engine 207 deploys the application 203 to the edge computing nodes 217-1, 217-2 via the communication unit 215, but does not deploy the application 203 to the edge computing nodes 217-3, 217-4, 217-5. The edge computing nodes 217-1, 217-2 may then install the application 203 locally and process requests for the application 203.

It is further understood that the edge computing nodes 217 continue to send the indications 503 to the receive engine 204 regardless of whether or not the application 203 is locally installed so that the engines 204, 205, 207, 209, 211, 213, etc. may continue to deploy (and/or delete) the application 203 based on demand for the application 203, as described herein.

It should be recognized that features and aspects of the various examples provided above may be combined into further examples that also fall within the scope of the present disclosure.

The invention claimed is:

1. A system comprising:

a memory storing an application; and a processor to:

receive, from a plurality of edge computing nodes via a communications network, a plurality of indications of requests for the application as received at the plurality of edge computing nodes from a plurality of edge clients, the plurality of indications indicative of geographic demand for the application;

determine, based on the plurality of indications, a geographic area having a first demand for the application that exceeds a threshold demand, wherein the geographic area is dynamically determined based on the geographic demand for the application such that a boundary of the geographic area grows or shrinks responsive to changes in the geographic demand;

subsequent to determining the geographic area, determine a subset of the plurality of edge computing nodes located within the boundary of the geographic area;

deploy, via the communications network, the application to the subset of the plurality of edge computing nodes located within the boundary of the geographic area, wherein, responsive to receipt of the application, each edge computing node included in the subset of the plurality of edge computing nodes is to: install the application locally; and, in response to receiving requests for the application, process the received requests via processing the application; and execute, with the processor, the application for an additional subset of the plurality of edge computing nodes without deployment of the application at the additional subset of the plurality of edge computing nodes to service subsequent requests for the application as forwarded to the processor from the additional subset of the plurality of edge computing nodes, wherein demand for the application at the additional subset is below the threshold demand.

2. The system of claim 1, wherein the processor is to:

generate, based on the plurality of indications, a heat map representing the geographic demand for the application, wherein the processor determines the geographic area based on the heat map; and wherein the processor represents the geographic area as a bounded shape on the heat map.

3. The system of claim 1, wherein the processor is to:

determine a geographic location of each edge computing node included in the plurality of the edge computing nodes based on: geographic metadata received with the plurality of indications.

4. The system of claim 1, wherein the processor is to:

receive, from the plurality of edge computing nodes via the communications network, a second plurality of indications of requests for the application, wherein the second plurality of indications are received at the plurality of edge computing nodes from the plurality of edge clients;

dynamically update, based on the second plurality of indications, the boundary of the geographic area as an updated boundary of the geographic area, wherein the updated boundary of the geographic area has an updated demand for the application that exceeds the threshold demand, wherein the updated boundary of the geographic area includes a portion of the geographic area as determined based on the plurality of indications; and dynamically update deployment of the application to a second subset of the plurality of edge computing nodes within the updated boundary of the geographic area, wherein the second subset of the plurality of edge computing nodes includes a portion of the subset of the plurality of edge computing nodes.

5. The system of claim 1, wherein the processor is to:

determine an edge computing node from the subset of the plurality of edge computing nodes within the boundary of the geographic area, wherein the edge computing device from the subset of the plurality of edge computing nodes within the boundary of the geographic area stores an additional application with an additional demand that is below the threshold demand;

transmit a command to the edge computing node included in the subset of the plurality of edge computing nodes within the boundary of the geographic area, the command to delete the additional application stored at the edge computing node included in the subset of the plurality of edge computing nodes within the boundary of the geographic area to clear memory space for storing the application at the edge computing node included in the subset of the plurality of edge computing nodes within the boundary of the geographic area; and subsequent to the edge computing device deleting the additional application, deploy the application to the edge computing node included in the subset of the plurality of edge computing nodes within the boundary of the geographic area such that the edge computing device installs the application locally and, in response to receipt of requests for the application, processes the received requests via processing the application.

6. The system of claim 1, wherein the processor is to:

determine a geographic location of each edge computing node included in the plurality of the edge computing nodes based on respective geographic metadata stored at the memory in association with an identifier of a respective edge computing node included in the plurality of edge computing nodes, wherein the identifier is received with a corresponding indication of the respective edge computing node.

7. The system of claim 1, wherein the processor is to:

determine a geographic location for each of the plurality of edge computing nodes; and determine the subset of the plurality of edge computing nodes within the geographic area based on the geographic location for each of the plurality of edge computing nodes.

8. The system of claim 1, wherein the processor is to deploy, via the communications network, the application to the subset of the plurality of edge computing nodes within the geographic area by transmitting a copy of executable instructions of the application to the subset of the plurality of edge computing nodes within the geographic area.

9. The system of claim 1, wherein the processor is to:

dynamically change deployment of the application responsive to a change in the first demand for the application, wherein the change in the first demand results from movement of the plurality of edge clients; and responsive to the change in the first demand for the application, determine a second subset of the plurality of edge computing nodes and deploy the application to the second subset of the plurality of edge computing nodes.

10. The system of claim 1, wherein the processor is to:

for each of the plurality of edge computing nodes, determine, for a respective edge computing node, an available memory space for the application by polling the plurality of edge computing nodes; and control deployment of the application over the communications network to the respective edge computing node based on the available memory space.

11. A method comprising:

receiving, at a hub computing device over a communications network, using a communication unit, from a plurality of edge computing nodes, a plurality of indications of requests for an application, wherein the requests for the application are received at the plurality of edge computing nodes from a plurality of edge clients, the plurality of indications indicative of geographic demand for the application;

determining, at the hub computing device, based on a heat map, a geographic area having a first demand for the application that exceeds a threshold demand, wherein the geographic area is dynamically determined based on the geographic demand for the application such that a boundary of the geographic area grows or shrinks responsive to changes in the geographic demand;

determining, at the hub computing device, a subset of the plurality of edge computing nodes located within the boundary of the geographic area;

deploying, at the hub computing device over the communications network, via the communication unit, the application to the subset of the plurality of edge computing nodes located within the boundary of the geographic area, the subset of the plurality of edge computing nodes to install the application locally and process requests via processing the application; and implementing executing, with a processor, at the hub computing device, the application for an additional subset of the plurality of edge computing nodes, wherein demand for the application at the additional subset is below the threshold demand and the application is not deployed at the additional subset to service subsequent requests for the application as forwarded to the processor from the additional subset of the plurality of edge computing nodes.

12. The method of claim 11, further comprising:

deploying, at the hub computing device over the communications network, via the communication unit, to the plurality of edge computing nodes, a list of applications available to be deployed, the list of applications including the application, to enable the plurality of edge computing nodes to recognize the requests for the application.

13. The method of claim 11, wherein deploying, at the hub computing device over the communications network, the application to the subset of the plurality of edge computing nodes comprises:

deploying, at the hub computing device over the communications network, using the communication unit, the application to a portion of the subset of the plurality of edge computing nodes, wherein the application is not deployed at the portion.

14. The method of claim 11, further comprising:

prior to deploying, at the hub computing device over the communications network, the application to the subset of the plurality of edge computing nodes, determining, at the hub computing device over the communications network, a portion of the subset having insufficient available memory space to store the application; and transmitting, at the hub computing device over the communications network, a command to each edge computing node included in the portion of the subset, the command to delete an additional application stored at each edge computing node included in the portion to increase the respective available memory space for storing the application.

15. A non-transitory computer-readable medium comprising instructions that, when executed by a processor, cause the processor to:

receive, from a plurality of edge computing nodes over a communications network, a plurality of indications of requests for an application, the plurality of indications received at the plurality of edge computing nodes from a plurality of edge clients, the plurality of indications being indicative of geographic demand for the application;

generate, based on the plurality of indications, a heat map representing the geographic demand for the application;

and control, based on the heat map, deployment of the application over the communications network to the plurality of edge computing nodes, wherein deployment of the application includes:

determining, based on the heat map, a geographic area having a first demand for the application that exceeds a threshold demand, wherein the geographic area is represented as a bounded shape on the heat map, and wherein the bounded shape forms a boundary around the geographic area and the plurality of edge computing nodes are included within the boundary, and wherein the geographic area is dynamically determined based on the geographic demand for the application such that the boundary of the geographic area grows or shrinks responsive to changes in the geographic demand;

transmitting a copy of instructions of the application to a first portion the plurality of edge computing nodes located within the boundary of the geographic area having the first demand for the application that exceeds the threshold demand, wherein the first portion of the plurality of edge computing nodes is to install the copy of instructions of the application and locally process requests via processing of the copy of instructions of the application;

and executing, with the processor, the application for a second portion of the plurality of edge computing nodes associated with a second demand for the application that is below the threshold demand to service subsequent requests for the application as forwarded to the processor from the second portion of the plurality of edge computing nodes.

16. The non-transitory computer-readable medium of claim 15, wherein the processor is to:

update the heat map responsive to receipt of a further indication, the further indication indicative of updated geographic demand for the application; and dynamically change deployment of the application to the plurality of edge computing nodes based on the heat map as updated.

17. The non-transitory computer-readable medium of claim 15, wherein the processor is to:

receive, from the plurality of edge computing nodes over the communication network, a plurality of additional indications of additional requests for an additional application as received at the plurality of edge computing nodes from the plurality of edge clients, the plurality of additional indications being indicative of respective geographic demand for the additional application;

generate, based on the plurality of additional indications, a respective heat map representing the respective geographic demand for the additional application; and transmit, to the first portion of the plurality of edge computing nodes over the communications network, commands to delete the additional application at the first portion of the plurality of edge computing nodes according to the respective heat map, to clear respective memory space at the first portion of the plurality of edge computing nodes such that the first portion of the plurality of edge computing nodes have available memory space to install the application and process requests via processing the application.

18. The non-transitory computer-readable medium of claim 15, wherein the processor is to:

during deployment of the application, refrain from deploying the application to a subset of the first portion of the plurality of edge computing nodes that presently have the application installed.

19. The non-transitory computer-readable medium of claim 18, wherein the processor is to:

refraining from deploying the application to the second portion of the plurality of edge computing nodes.

20. The non-transitory computer-readable medium of claim 15, wherein the processor is to:

divide a region of the heat map into geographic areas, including the geographic area; and indicate a demand level for each geographic area.

* * * * *